(12) United States Patent
Brown et al.

(10) Patent No.: US 8,811,663 B2
(45) Date of Patent: Aug. 19, 2014

(54) OBJECT DETECTION IN CROWDED SCENES

(75) Inventors: Lisa M. Brown, Pleasantville, NY (US); Rogerio S. Feris, White Plains, NY (US); Sharathchandra U. Pankanti, Darien, CT (US); James Petterson, Turner (AU); Behjat Siddiquie, Hyattsville, MD (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 13/150,952

(22) Filed: Jun. 1, 2011

(65) Prior Publication Data

US 2012/0170805 A1 Jul. 5, 2012

Related U.S. Application Data

(60) Provisional application No. 61/429,794, filed on Jan. 5, 2011.

(51) Int. Cl.
*G06K 9/00* (2006.01)
*G06K 9/62* (2006.01)

(52) U.S. Cl.
CPC .......... *G06K 9/6256* (2013.01); *G06K 9/00785* (2013.01); *G06K 9/6264* (2013.01); *G06K 9/00778* (2013.01)
USPC ....................................................... 382/103

(58) Field of Classification Search
USPC ......................................... 382/103, 173–180
See application file for complete search history.

(56) References Cited

U.S. PATENT DOCUMENTS

| | | | | |
|---|---|---|---|---|
| 2003/0161500 A1* | 8/2003 | Blake et al. | | 382/103 |
| 2004/0234136 A1* | 11/2004 | Zhu et al. | | 382/224 |
| 2005/0047629 A1* | 3/2005 | Farrell et al. | | 382/117 |
| 2005/0238201 A1* | 10/2005 | Shamaie | | 382/103 |
| 2008/0226190 A1* | 9/2008 | Bae et al. | | 382/256 |

OTHER PUBLICATIONS

Agarwal, S. et al., "Learning to detect objects in images via a sparse, part-based representation" IEEE Transactions on PAMI, 26(11), Nov. 2004, pp. 1475-1490.
Dalal, N. et al., "Histograms of oriented gradients for human detection" In CVPR, Jun. 2005. (8 pages).
Fattal, R et al., "Gradient domain high dynamic range" In ACM SIGGRAPH, Jul. 2002. (8 pages).
Felzenszwalb, P. et al., "Cascade object detection with deformable part models" In CVPR, Jun. 2010. (8 pages).
Griffin, G. et al., "Caltech-256 Object Category Dataset" Caltech Technical Report No. 7964, Mar. 2007. (20 pages).
Hampapur, A. et al. "Searching surveillance video" In AVSS, Sep. 2007. (6 pages).

(Continued)

*Primary Examiner* — Alex Liew
(74) *Attorney, Agent, or Firm* — Tutunjian & Bitetto, P.C.; Anne V. Dougherty

(57) ABSTRACT

Methods and systems are provided for object detection. A method includes automatically collecting a set of training data images from a plurality of images. The method further includes generating occluded images. The method also includes storing in a memory the generated occluded images as part of the set of training data images, and training an object detector using the set of training data images stored in the memory. The method additionally includes detecting an object using the object detector, the object detector detecting the object based on the set of training data images stored in the memory.

25 Claims, 11 Drawing Sheets

1000

Original Images
1010

Occlusion Generation
1020

Dilated foreground mask

Modified Gradient Field
1030

Zero values along mask border

Poisson Reconstruction
1040

(56) References Cited

OTHER PUBLICATIONS

Lin, Y. et al., "Fast object detection with occlusions" In ECCV, May 2004. (12 pages).

Javed, O. et al., "Online detection and classification of moving objects using progressively improving detectors" In CVPR, Jun. 2005. (6 pages).

Roth, P. et al., "On-line conservative learning for person detection" In PETS Workshop, Oct. 2005. (8 pages).

Russakovsky, O. et al., "Attribute learning in largescale datasets" In ECCV 2010 Workshop on Parts and Attributes, Sep. 2010. (14 pages).

Schneiderman, H. et al., "A statistical approach to 3D object detection applied to faces and cars" In CVPR, May 2000. (106 pages).

Senior, A. et al., "Appearance models for occlusion handling" 2nd IEEE Int. Workshop on PETS, Dec. 2001. (8 pages).

Stauffer, C. et al., "Adaptive background mixture models for real-time tracking" In CVPR, Jun. 1998. (7 pages).

Tian, Y. et al., "Robust and efficient foreground analysis for real-time video surveillance" In CVPR, Jun. 2005. (6 pages).

Viola, P. et al., "Robust Real-time Object Detection." Second International Workshop on Statistical and Computational Theories of Vision, Jul. 2001. (25 pages).

Wu, B. et al., "Cluster boosted tree classifier for multi-view, multi-pose object detection" In ICCV, Oct. 2007. (8 pages).

Zheng, W. et al., "Fast car detection using image strip features" In CVPR, Jun. 2009, pp. 2703-2710.

Merler, S. et al., "Parallelizing AdaBoost by weights dynamics" Computational Statistics & Data Analysis, 51(5):2487-2498, 2007.

Everingham, M et. al., "The PASCAL Visual Object Classes Challenge 2007 (VOC2007) Results." http://www.pascalnetwork.org/challenges/VOC/voc2007/workshop/index.html (2 pages).

Kuo, C. et al., "Robust multi-view car detection using unsupervised sub-categorization" WACV, Dec. 2009. (8 pages).

\* cited by examiner

OBJECT DETECTION IN CROWDED SCENES

CROSS-REFERENCE TO RELATED APPLICATIONS

This application claims the benefit of U.S. Provisional Application Ser. No. 61/429,794, filed on Jan. 5, 2011, which is incorporated by reference herein in its entirety.

BACKGROUND

1. Technical Field

The present invention generally relates to object detection and, more particularly, to object detection in crowded scenes.

2. Description of the Related Art

Security incidents in urban environments span a wide range, starting from property crimes, to violent crimes and terrorist events. Many large urban centers are currently in the process of developing security infrastructures geared mainly to counterterrorism with secondary applications for police and emergency management purposes. In this context, the ability to automatically search for objects of interest, particularly vehicles, is extremely important. Recently, detection systems have been afforded the capability to answer queries such as "Show me all the two-door red vehicles in camera X from time Y to Z". A pre-requisite to enable this capability is to accurately locate vehicles in the video images, so that attribute extraction and indexing can be performed.

Figure 1:
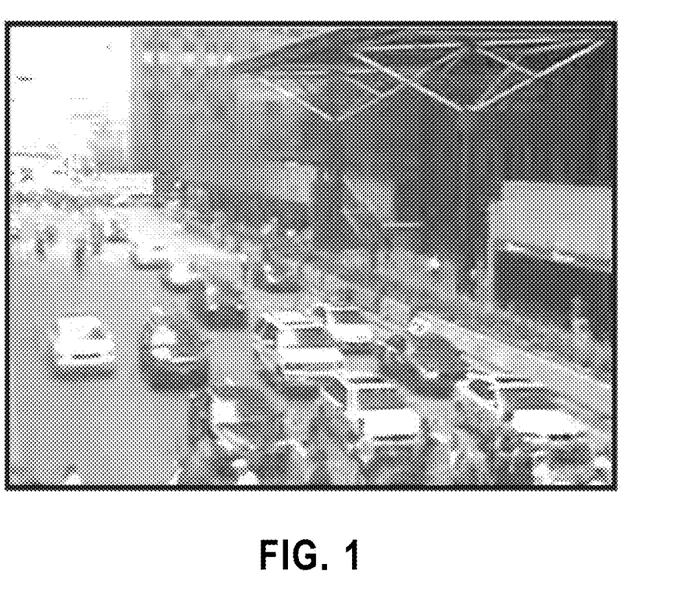
FIG. 1 shows a typical crowded urban scene 100 to which event detection may be applied.
Figure 2:
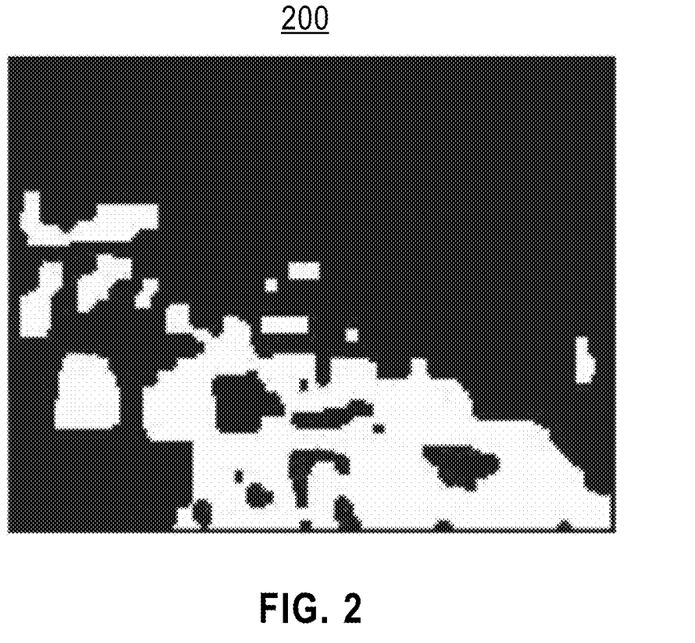
FIG. 2 shows corresponding foreground blobs 200 obtained through background subtraction according to conventional event detection.

Consider a goal of detecting vehicles in each frame captured by a static surveillance camera monitoring an urban environment. Urban scenarios pose unique challenges for vehicle detection. High volumes of activity data, different weather conditions, crowded scenes, partial occlusions, lighting effects such as shadows and reflections, and many other factors cause serious issues in real system deployments, making the problem very challenging. Traditional methods based on background modeling generally fail under these difficult conditions, as illustrated in FIGS. 1 and 2. FIG. 1 shows a typical crowded urban scene 100 to which event detection may be applied. FIG. 2 shows corresponding foreground blobs 200 obtained through background subtraction according to conventional event detection. Note that the prior art approach clusters groups of vehicles into the same blob.

Various models and methods have been proposed for appearance-based object detection, in particular vehicle detection. Although appearance-based detectors have achieved very good performance in challenging scenarios, they usually require tedious labeling of thousands of training samples to work well. In addition, most methods run below 15 frames per second in conventional machines, which is not desirable for large-scale surveillance systems requiring many video channels to be processed by a single machine.

Co-training and online learning methods alleviate the manual labeling issue, while constantly adapting the detector as new data comes in. However, a common limitation of these techniques is the inaccuracy in capturing online data to correctly update the classifier.

Several datasets have been proposed for learning and evaluation of vehicle detection algorithms. However, these datasets mostly include vehicle images restricted to frontal/rear and side poses and the number of vehicle images is of the order of 1000, which in our opinion, is insufficient for capturing the entire degree of variation in the appearance of cars due to changes in pose, viewpoint, illumination and scale.

Methods for occlusion handling in object detection generally rely on object part decomposition and modeling. In our application, however, these methods are not well suited due to the low-resolution vehicle images. Video-based occlusion handling from the tracking perspective has been addressed, but it assumes that objects are initially far apart before the occlusion occurs.

SUMMARY

According to an aspect of the present principles, a method for object detection is provided. The method includes automatically collecting a set of training data images from a plurality of images. The method further includes generating occluded images. The method also includes storing in a memory the generated occluded images as part of the set of training data images, and training an object detector using the set of training data images stored in the memory. The method additionally includes detecting an object using the object detector, the object detector detecting the object based on the set of training data images stored in the memory.

According to yet another aspect of the present principles, a system for object detection is provided. The system includes a training data collector configured to automatically collect a set of training data images from a plurality of images. The system further includes an occluded image generator configured to generate occluded images. The system also includes a memory configured to store the generated occluded images as part of the set of training data images. The system additionally includes an object detector. The system further includes a detector trainer configured to train the object detector using the set of training data images stored in the memory. The object detector detects an object based on the set of training data images stored in the memory.

According to still another aspect of the present principles, a computer readable storage medium comprising a computer readable program is provided. The computer readable program when executed on a computer causes the computer to perform the respective steps of the aforementioned method.

According to a further aspect of the present principles, another method for object detection is provided. The method includes automatically collecting a set of training data images from a plurality of images. The method further includes synthetically generating occluded images using Poisson image reconstruction applied to image gradients of at least some of the training data images in the set. The method also includes storing in a memory the synthetically generated occluded images as part of the set of training data images. The method additionally includes training an object detector by applying a machine learning algorithm over the set of training data images stored in the memory to select a feature configuration for use in object detection. The method further includes detecting an object using the object detector. The object detector detects the object based on the set of training data images stored in the memory and the feature configuration selected using the machine learning algorithm.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

As noted above, the present principles are directed to object detection in crowded scenes. Thus, while one or more embodiments of the present principles are described herein with respect to vehicle detection for the purpose of illustration, it is to be appreciated that the present principles may be used to detect any object within an image and/or video. In an embodiment, the present principles may involve the following components: (1) automatic training data collection; (2) synthetic generation of occlusions; and (3) large-scale feature selection.

In an embodiment, the present principles may be used, for example, for vehicle detection in challenging urban scenarios (e.g., in urban surveillance videos). Advantageously, embodiments of the present principles are capable of handling unstructured and crowded environments with large occlusions, different vehicle shapes, and environmental conditions such as lighting changes, rain, shadows, and reflections. This is achieved with virtually no manual labeling efforts. The system runs quite efficiently on a conventional laptop computer.

In an embodiment, the present principles involve the following: (1) a co-training scheme where data is automatically captured based on motion and shape cues and used to train a detector based on appearance information; (2) an occlusion handling technique based on synthetically generated training samples obtained through Poisson image reconstruction from image gradients; and (3) massively parallel feature selection over multiple feature planes which allows the final detector to be more accurate and more efficient.

Thus, we start by describing a method to automatically collect training samples for a particular camera view with almost no user interaction. Based on very few manual exemplars (usually 1-4) provided by the user, a rule-based classifier using motion and shape cues is created to collect a large set of training samples in low-activity conditions with almost no false alarms. In a co-training scheme, we use this collected data to train a camera-specific appearance-based detector, which works in high-activity scenes and is robust to environmental factors such as different weather conditions, shadows, rain, and so forth. Thus, in an embodiment, the plurality of images from which the set of training data images are automatically collected represent a set of activity levels, and the detector is configured to detect the object in an image, where that image has a higher level of activity than activity levels included in the set. In such a context, activities refer to moving (e.g., object motion), scenes, weather conditions, and so forth. Hence, while the training data may represent simple activities (conditions), the detector is trained to detect objects in images representing more complex activities (conditions), such as those involving more people, vehicles, and/or objects, bad weather (rain, snow, fog, etc.), shadows, and so forth, thus advantageously providing a robust detector from simple training data.

We further note that the data captured in simple conditions was captured based on motion and shape cues (no appearance) and therefore exhibits a lot of appearance changes (e.g., different lighting conditions). Then we use this data to train a detector based on appearance information (using ADABOOST learning in one embodiment), which is robust to crowds, complex conditions, and so forth. That is why we are able to get robustness to complex conditions from data captured in simple conditions (in the first step of a method described hereinafter, since we do not use appearance in the first step, but we use appearance in the second step, which is complementary and good for dealing with crowds, and so forth).

This data collection technique was applied to capture training samples from many city surveillance cameras, leading to a gigantic dataset of real-world vehicle images. Our dataset includes nearly one million images, about 1000× the size of existing publicly available vehicle datasets. In accordance with an embodiment of the present principles, we used this data to train per-camera detectors, but it could be used to train generic detectors as well.

In order to deal with partial occlusions, we propose a method for generating realistic occluded vehicles through Poisson image reconstruction from image gradients. The idea is to take advantage of the appearance and structure of vehicles occluding other vehicles.

Finally, we show that large-scale feature selection over multiple feature planes improves the accuracy as well the efficiency of the final detector. We consider a huge set of potential feature configurations and develop a machine learning algorithm for making the feature selection problem tractable.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
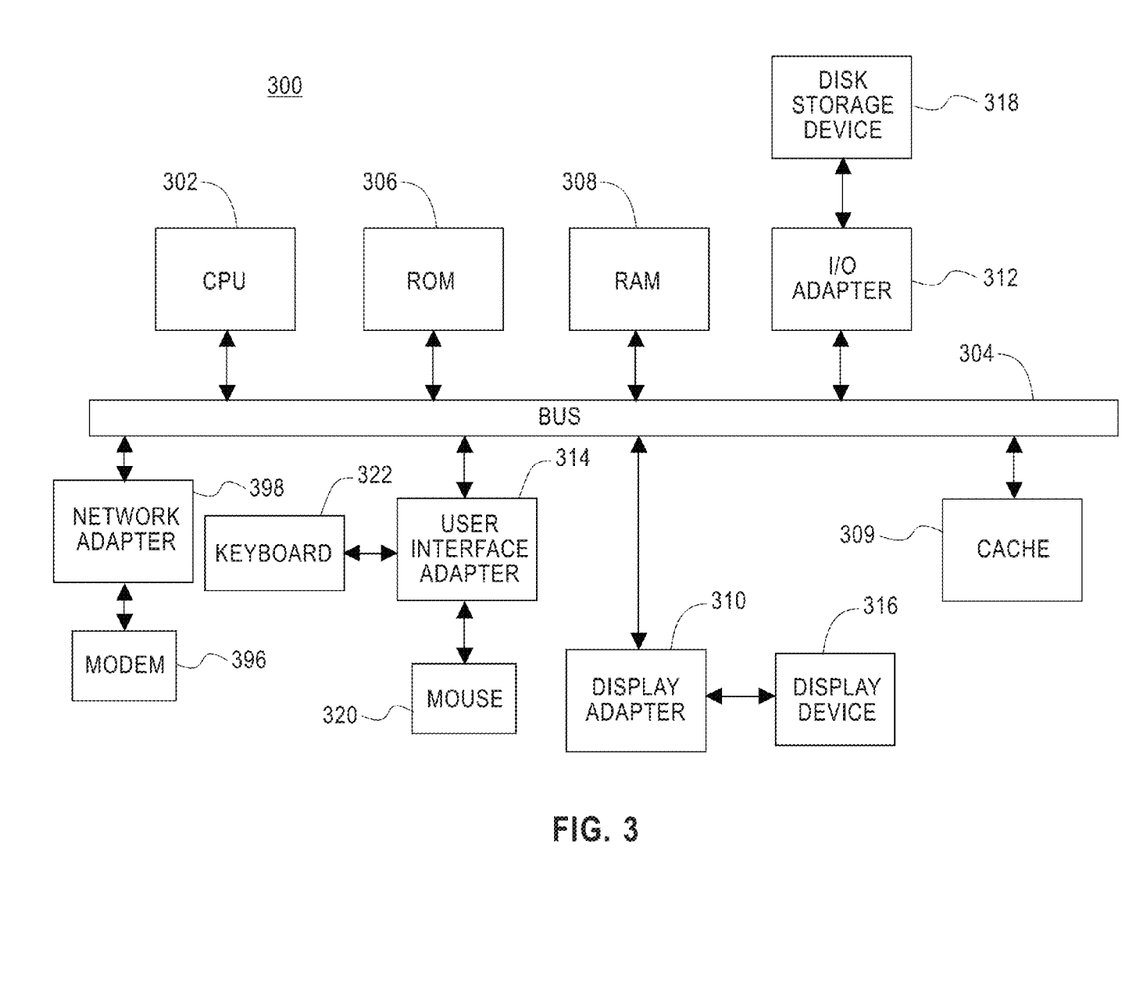
FIG. 3 shows an exemplary processing system 200 to which the present invention may be applied, according to an embodiment of the present principles.

FIG. 3 is a block diagram showing an exemplary processing system 300 to which the present invention may be applied, according to an embodiment of the present principles. The processing system 300 includes at least one processor (CPU) 302 operatively coupled to other components via a system bus 304. A read only memory (ROM) 306, a random access memory (RAM) 308, a display adapter 310, an I/O adapter 312, a user interface adapter 314, and a network adapter 398, are operatively coupled to the system bus 304.

A display device 316 is operatively coupled to system bus 304 by display adapter 310. A disk storage device (e.g., a magnetic or optical disk storage device) 318 is operatively coupled to system bus 304 by I/O adapter 312.

A mouse 320 and keyboard 322 are operatively coupled to system bus 304 by user interface adapter 314. The mouse 320 and keyboard 322 are used to input and output information to and from system 300.

A (digital and/or analog) modem 396 is operatively coupled to system bus 304 by network adapter 398.

Of course, the processing system 300 may also include other elements (not shown), including, but not limited to, a sound adapter and corresponding speaker(s), and so forth, as readily contemplated by one of skill in the art.

Figure 4:
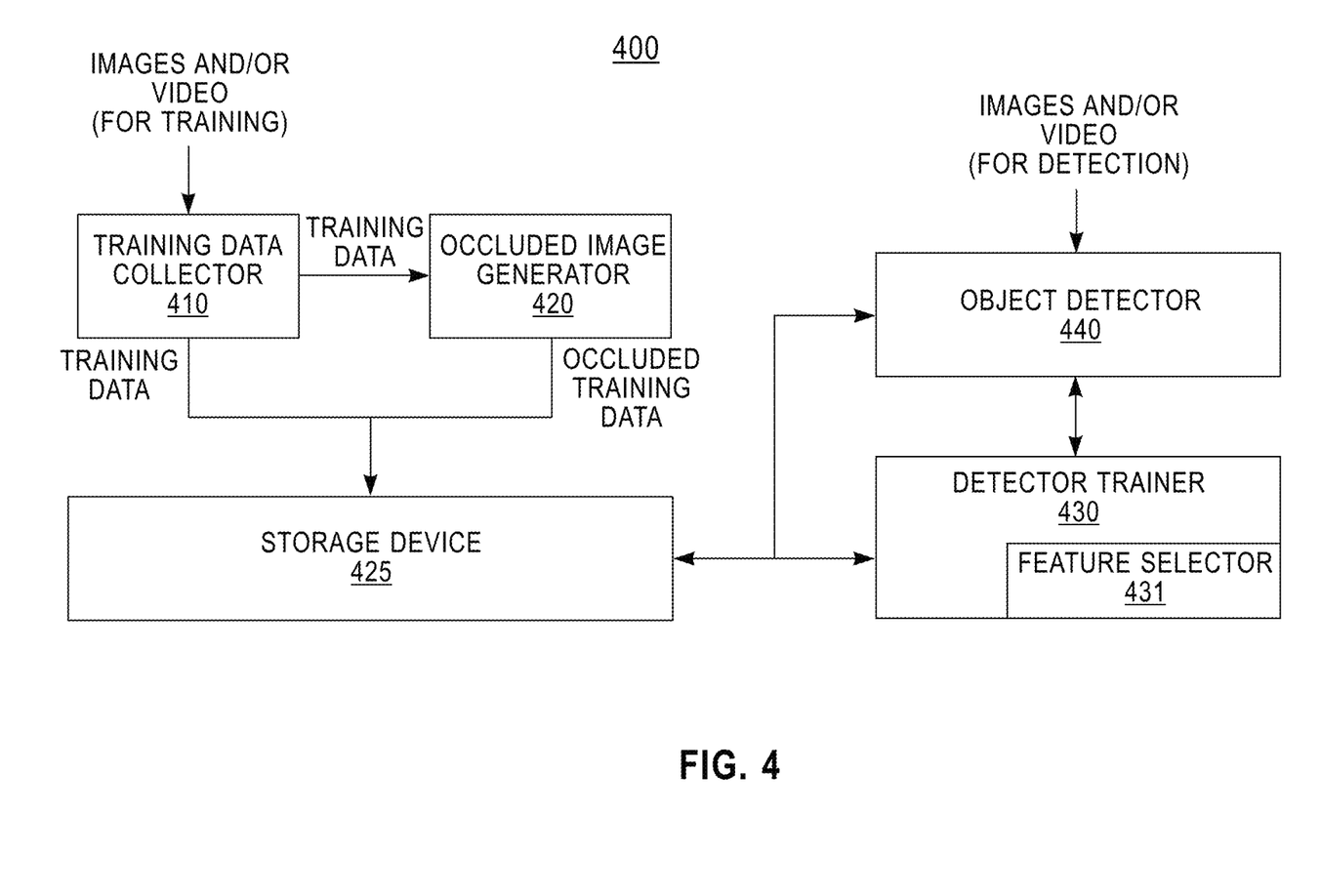
FIG. 4 shows an exemplary system 400 for object detection in crowded scenes, according to an embodiment of the present principles.

FIG. 4 shows an exemplary system 400 for object detection in crowded scenes, according to an embodiment of the present principles. The system includes a training data collector 410, an occluded image generator 420, a storage device 425, a detector trainer 430 having a feature selector 431, and an object detector 440. The functions of the elements of system 400 are described in detail hereinafter.

Figure 5:
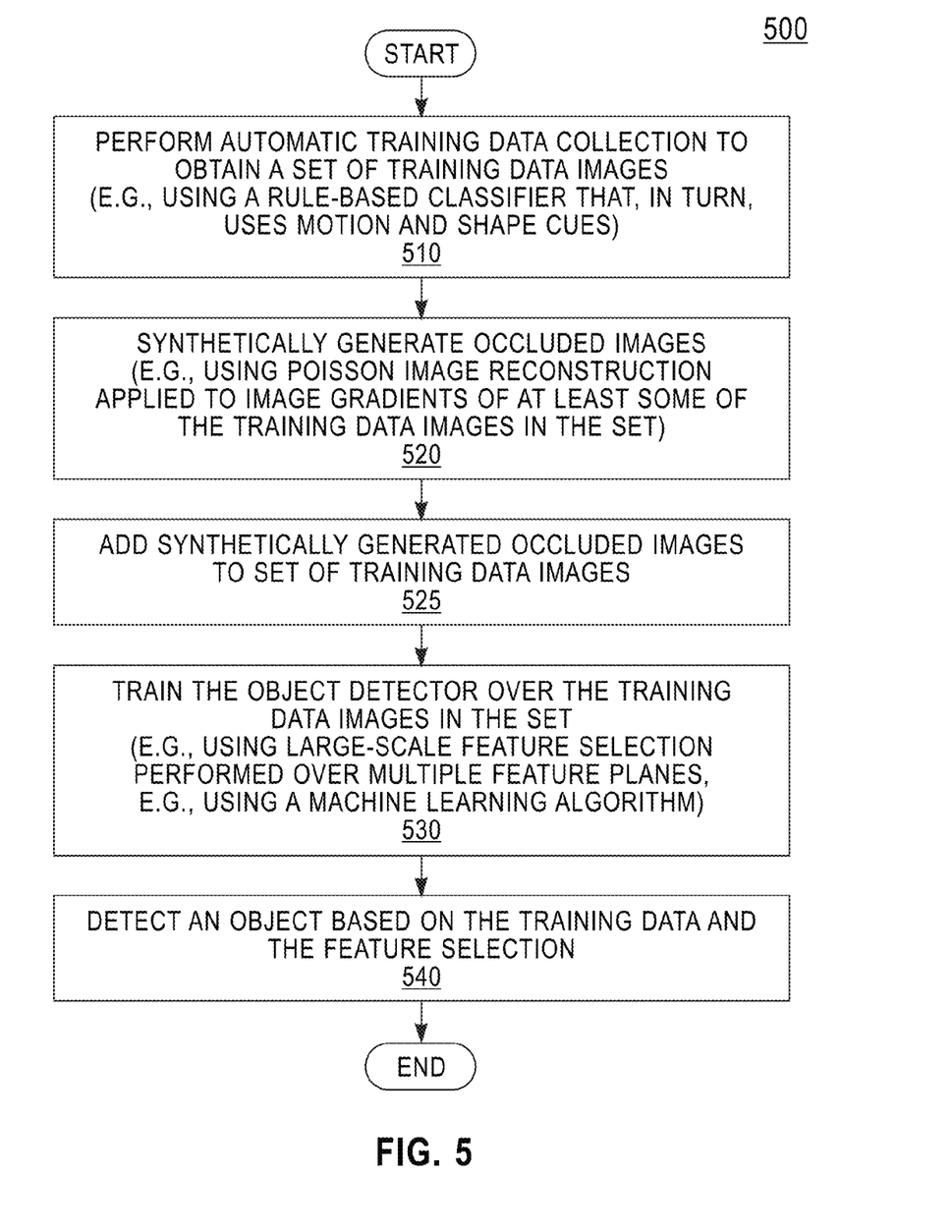
FIG. 5 shows an exemplary method 500 for object detection in crowded scenes, according to an embodiment of the present principles.

FIG. 5 shows an exemplary method 500 for object detection in crowded scenes, according to an embodiment of the present principles.

Figure 9:
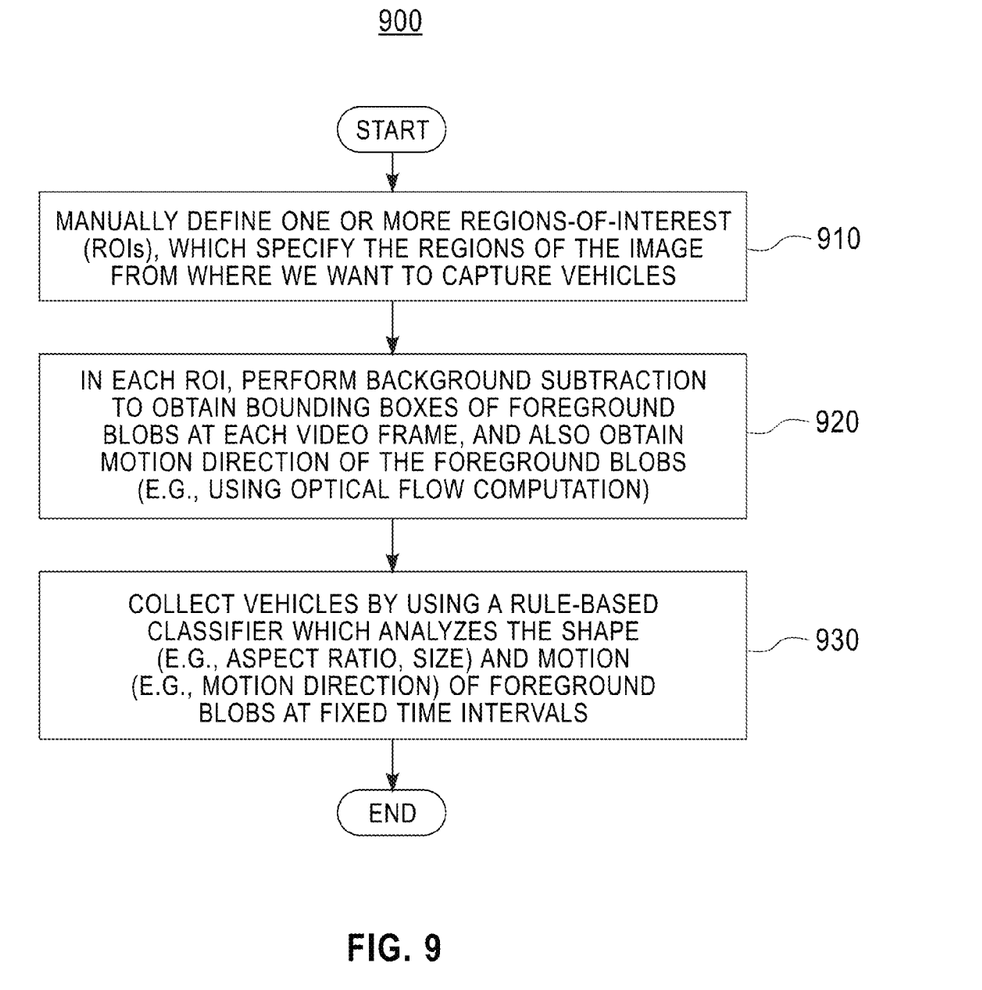
FIG. 9 shows a method 900 for training data collection, according to an embodiment of the present principles.

At step 510, automatic training data collection is performed by the training data collector 410 to obtain a set of training data images. In an embodiment, such training data collection involves a rule-based classifier that uses motion and shape cues. FIG. 9 hereinafter describes one possible embodiment of step 510.

Figure 10:
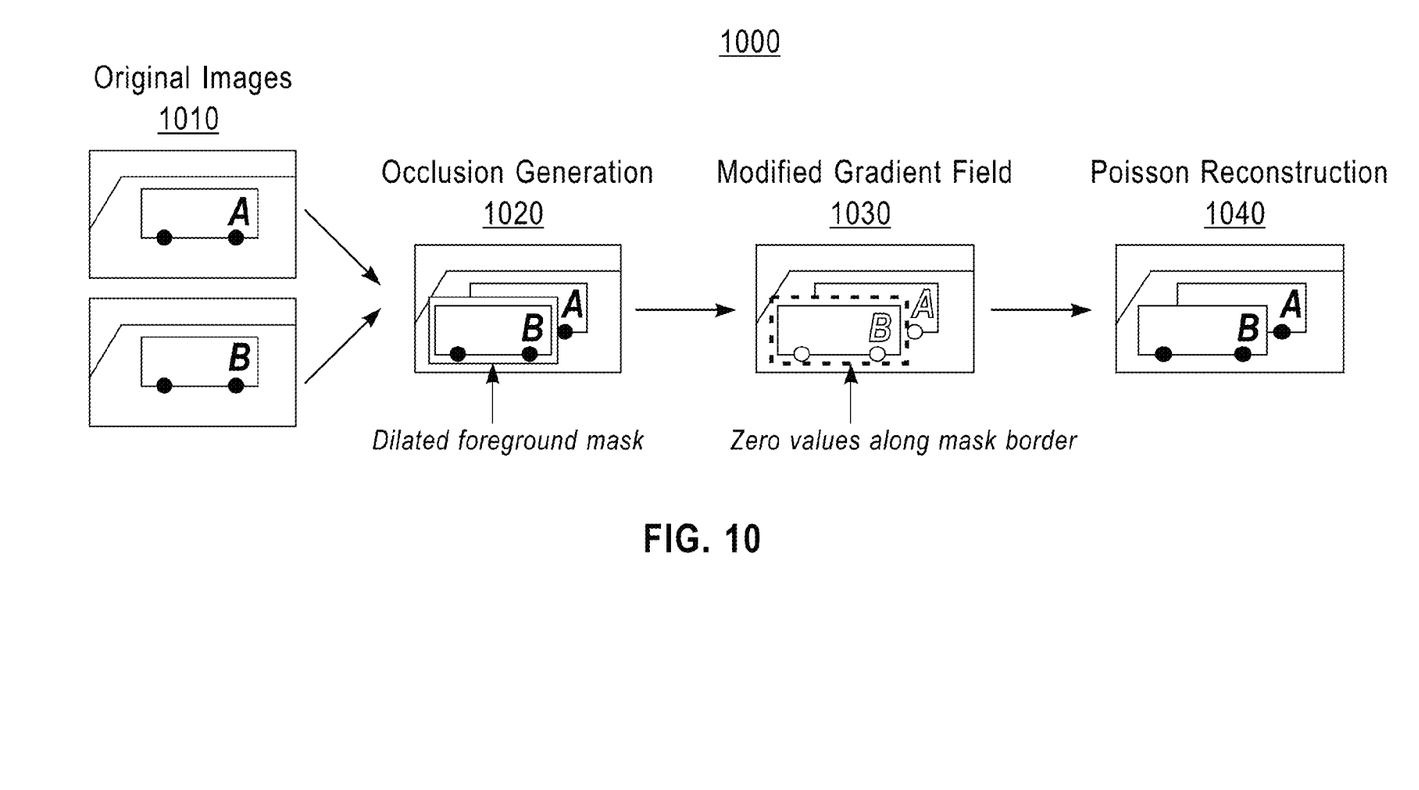
FIG. 10 shows a graphical depiction of a method 1000 for generating realistic partially occluded vehicle images, according to an embodiment of the present principles.
Figure 11:
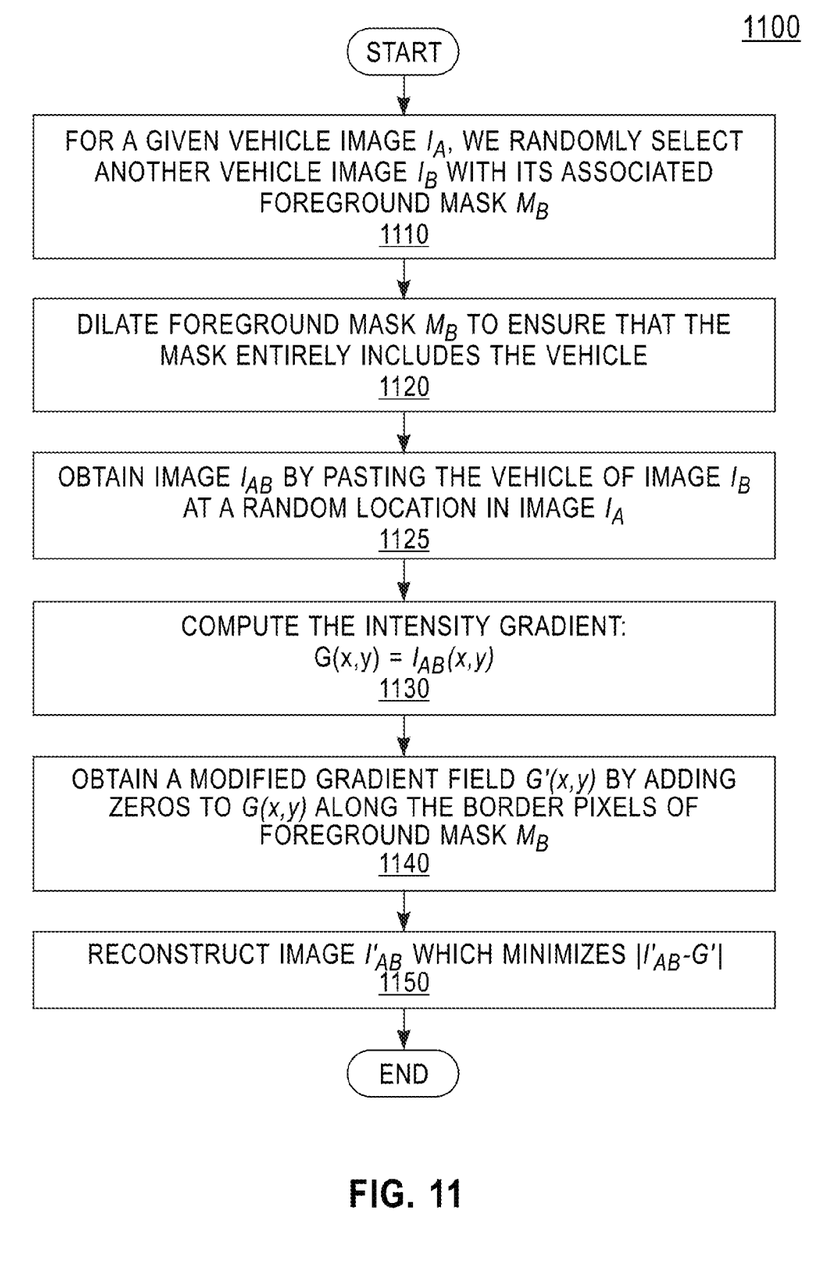
FIG. 11 shows the method 1000 of FIG. 10 in further detail, in accordance with an embodiment of the present principles.

At step 520, occluded images are synthetically generated by the occluded image generator 420. In an embodiment, the occluded images are synthetically generated using Poisson image reconstruction applied to image gradients of at least some of the training data in the set. FIGS. 10 and 11 hereinafter describe a possible embodiment of step 520.

At step 525, the synthetically generated occluded images are added to the set of training data images.

Figure 13:
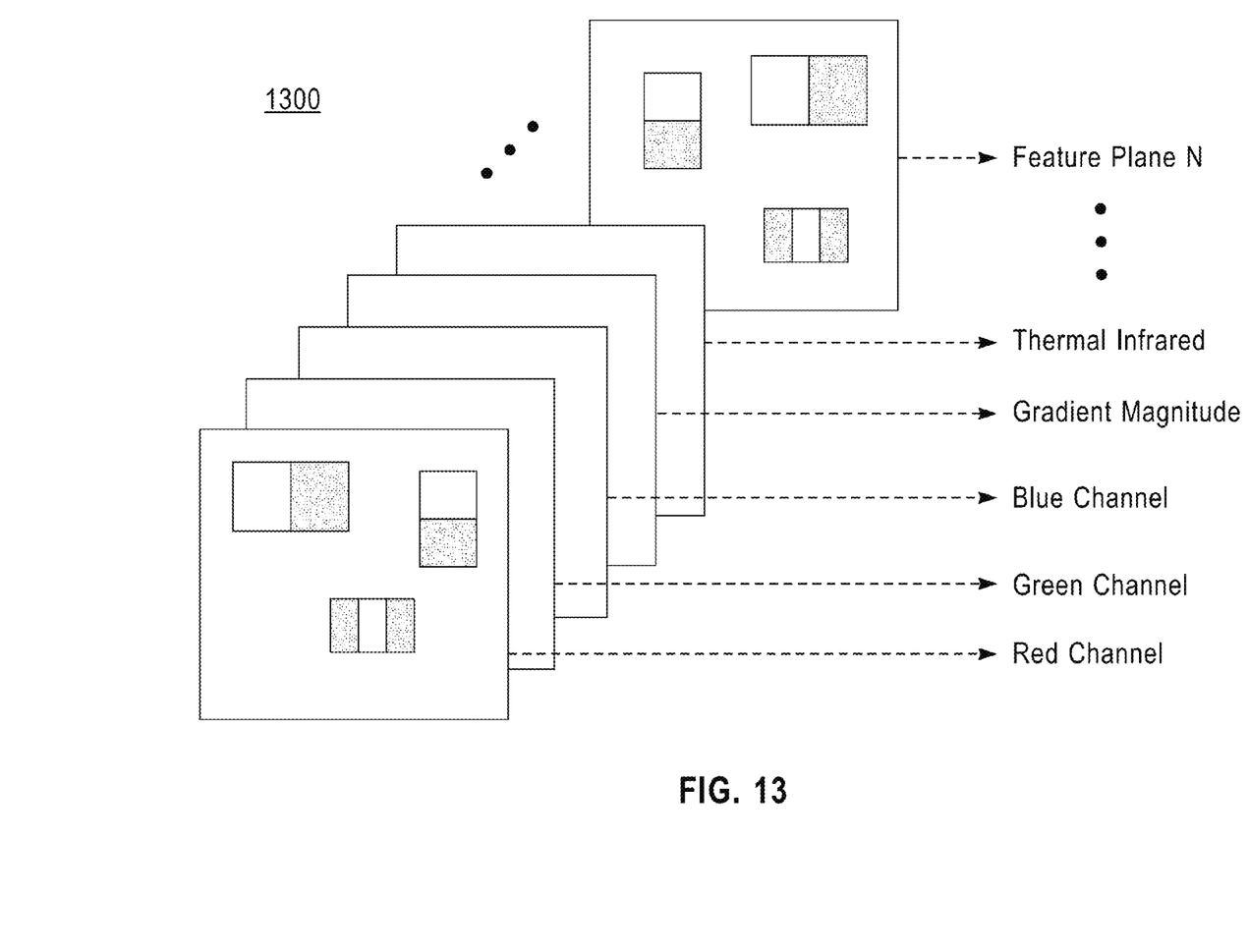
FIG. 13 shows feature selection 1300 over multiple planes, according to an embodiment of the present principles.

At step 530, the object detector 440 is trained over the training data images in the set (which includes the synthetically generated occluded images) using the training detector 430. Such training may involve large-scale feature selection performed by the feature selector 431. In an embodiment, such feature selection is performed over multiple feature planes. In an embodiment, such feature selection is performed over the multiple feature planes in parallel. In an embodiment, a machine learning algorithm is used for the feature selection. FIG. 13 hereinafter describes a possible embodiment of step 530.

At step 540, an object is detected using the object detector 440. Given a video frame, the object detector 440 is applied by sliding a search window over the image at multiple scales and positions. For each position/scale of the search window, the detector 440 is applied to report whether the object of interest is present at that particular image position/scale. Thus, detection is based on the application of the sliding window, in consideration of the feature selection and the training data, the latter including the synthetically generated occluded images. A sliding window of the type widely used in the computer vision community may be used to implement the present principles, or some other type of sliding window may be used, while maintaining the spirit of the present principles.

We now describe our approach for automatic vehicle detection in urban scenes, including the training dataset formation, synthetic generation of occlusions, and large-scale detector learning.

Automatic Data Collection

Since it is infeasible to manually collect a large and diverse dataset that includes cropped images of vehicles, we devised a simple procedure to automatically collect images of vehicles in traffic videos, which we now describe.

Figure 6:
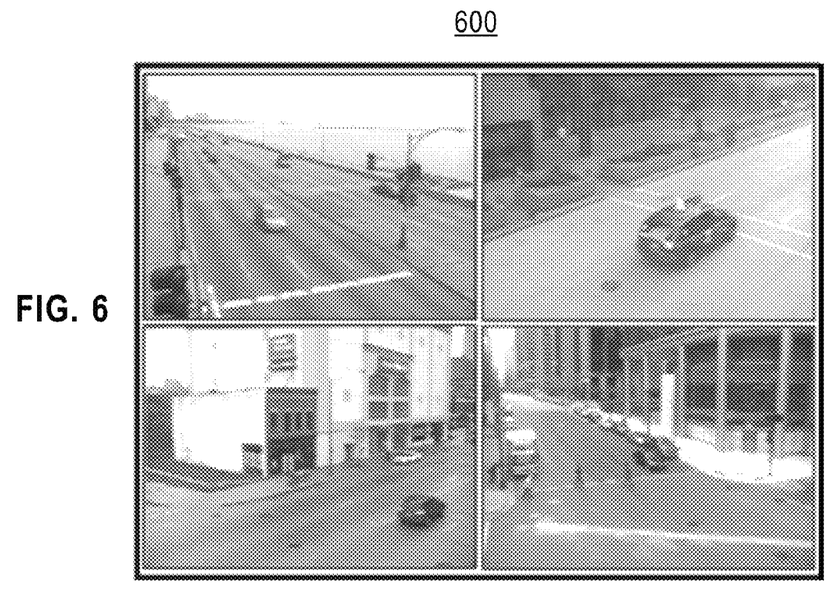
FIG. 6 shows sample shots 600 from traffic surveillance cameras to which the present principles may be applied, according to an embodiment of the present principles.
Figure 7:
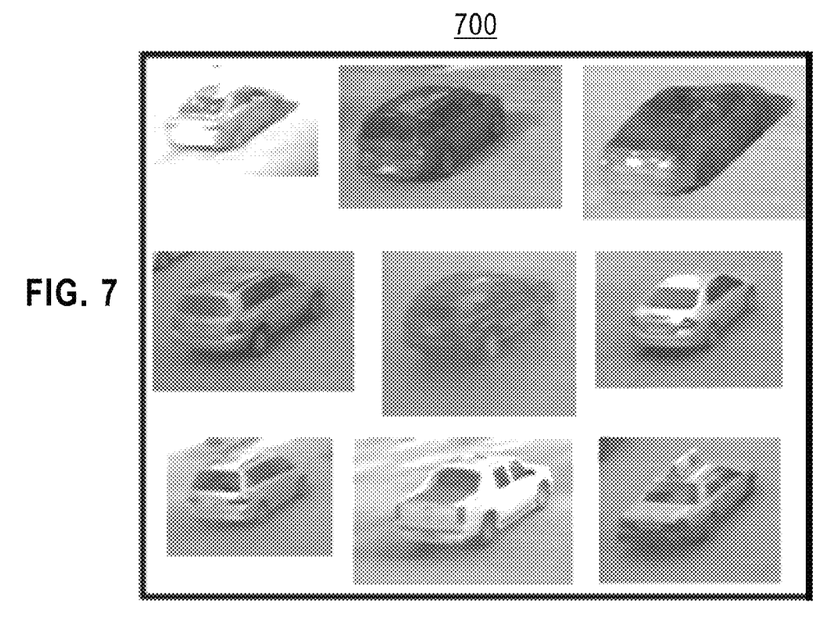
FIG. 7 shows illumination variation 700 in a dataset of car images collected from a single camera view to which the present principles may be applied, according to an embodiment of the present principles.
Figure 8:
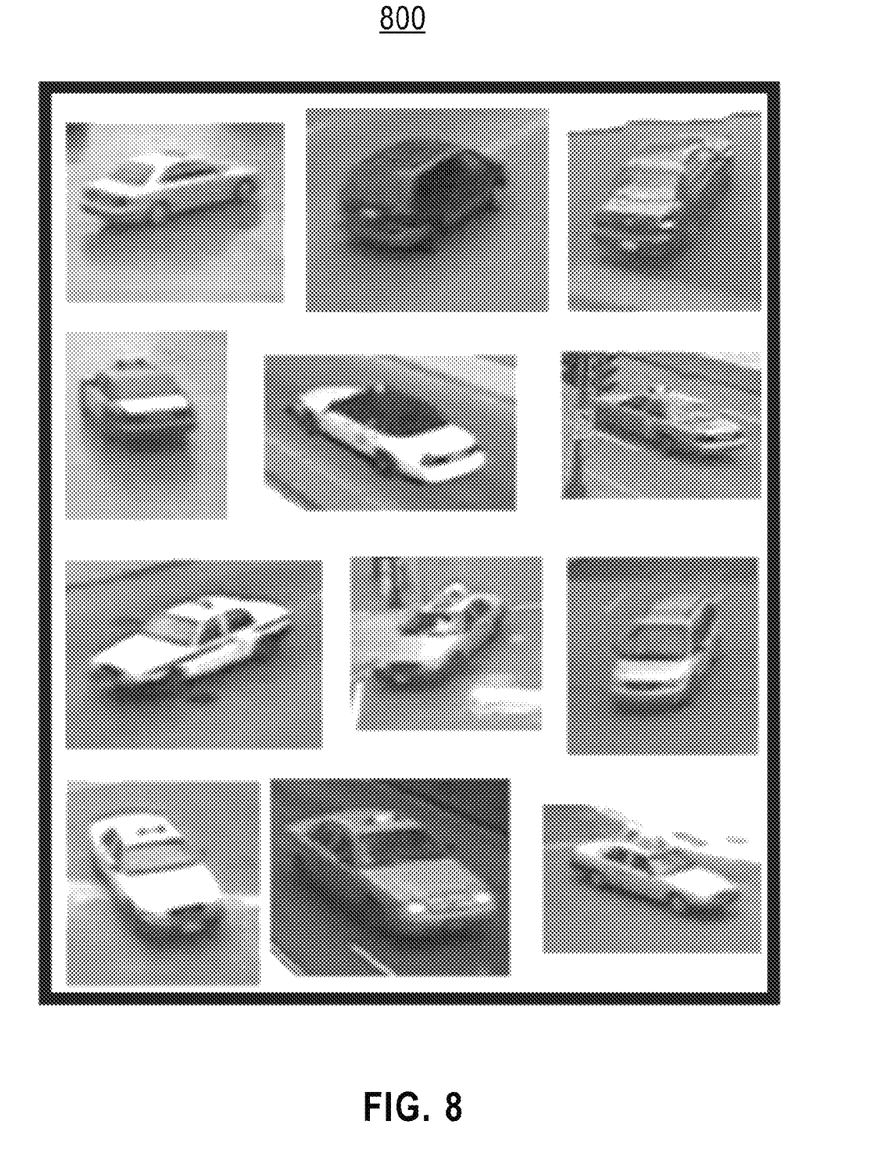
FIG. 8 shows vehicles 800 categorized into 12 categories according to their direction of motion, according to an embodiment of the present principles.

FIG. 6 shows sample shots 600 from traffic surveillance cameras to which the present principles may be applied, according to an embodiment of the present principles. FIG. 7 shows illumination variation 700 in a dataset of car images collected from a single camera view to which the present principles may be applied, according to an embodiment of the present principles. FIG. 8 shows vehicles 800 categorized into 12 categories according to their direction of motion, according to an embodiment of the present principles. The categories include the following directions of motion (0-30 degrees, 30-60 degrees, . . . , 330-360 degrees). Thus, as is evident, there is significant diversity in the poses of the cards in the dataset.

We collected videos from about 30 traffic surveillance cameras (see FIG. 6), which constantly captured data over a period of several months, providing us with data in a variety of illumination and weather conditions. Furthermore, due to variations in the positions of these cameras with respect to the direction of traffic, there were large variations in the vehicle poses captured from different cameras (see FIG. 8).

In each camera-view, vehicles usually appear in 1-4 poses, as a traffic camera typically overlooks either a single road or an intersection. In an embodiment, we collect data per camera for each vehicle pose independently.

FIG. 9 shows a method 900 for training data collection, according to an embodiment of the present principles. At step 910, we manually define one or more regions-of-interest (ROI), which specify the regions of the image from where we want to capture vehicles.

At step 920, in each ROI, we perform background subtraction to obtain the bounding boxes of foreground blobs at each video frame. We also obtain the associated motion direction of foreground blobs. The associated motion direction of the foregrounds blobs may be obtained, for example, but not limited to, using standard optical flow computation.

At step 930, we collect vehicles by using a simple rule-based classifier which analyzes the shape and motion of foreground blobs at fixed time intervals. More specifically, in an embodiment, we just check whether the aspect ratio, size, and motion direction of a particular foreground blob are within a pre-defined range of values that characterizes a vehicle. The range of values is obtained heuristically from very few manually labeled exemplars (usually 1-4, depending on the number of vehicle poses in the scene). We note that in an embodiment, the manually labeled exemplars provided by the user may include, but are not limited to, one or more vehicle bounding boxes drawn by the user in the video.

This simple procedure enables us to collect a large number of vehicle images, while requiring minimal supervision. Referring back to FIG. 7, we note that the same shows examples of training samples captured using a 10 hours video (from 8 AM to 6 PM) for a specific camera and specific vehicle pose. In this experiment, we were able to capture a few thousands of samples without false alarms. Note that we have many false negatives as we are conservative, e.g., in this video, the classifier rejected many vehicle samples in crowded periods, or vehicles with long attached shadows, and so forth. However we can see in FIG. 7 that we capture samples including a huge amount of appearance variation such as, for example, different lighting, weather conditions, vehicle models, and so forth. This is useful for training the appearance-based detector.

Using this data collection method, we were able to collect a dataset including about 1 million images of vehicles. We categorized each vehicle into one of 12 different categories depending on its motion direction, to give a coarse estimate of its pose (FIG. 8). There is a wide variation in the scale and pose of vehicles collected from different cameras, even when they have the same motion direction. We notice very few false alarms in the data collection process, namely in rare cases such as, for example, when a group of small objects have the same aspect ratio, size, and motion direction of a vehicle. These samples were manually pruned from our dataset.

Poisson Occlusion Handling

Although the algorithm described herein before can collect vehicle samples under significant variation of appearance, it fails to capture samples with partial occlusion. We now describe a fully automatic process to generate realistic partially occluded vehicle images. Adding images with occlusions to the training set makes the detector much more robust to crowded scenarios.

FIG. 10 shows a graphical depiction of a method 1000 for generating realistic partially occluded vehicle images, according to an embodiment of the present principles. At step 1010, two original images are input/received. At step 1020, occlusion generation is performed to obtain an initial occluded image, which generally involves occluding a vehicle (or any object) in the first input image using another vehicle (or another object) in the second input image. At step 1030, a modified gradient field is obtained based on the intensity gradient calculated from the initial occluded image. At step 1040, a Poisson image reconstruction of the initial occluded image is performed to obtain a synthetically generated partially occluded vehicle (or another object) image. As used herein, the phrase "Poisson image reconstruction" refers to a stochastic image reconstruction process applied to image gradients (of training data) that involves solving a form of Poisson's equation. In further detail, a Poisson image reconstruction is a stochastic image reconstruction process where an image is reconstructed from a (modified) gradient field by solving the Poisson differential equation $\nabla I'_{AB}=\text{div}G'$, where the Poisson differential equation involves a Laplace and a divergence operator $\nabla$. Further details of such image reconstruction are provided below with respect to FIG. 11.

FIG. 11 shows the method 1000 of FIG. 10 in further detail, in accordance with an embodiment of the present principles. At step 1110, for a given vehicle image $I_A$, we randomly select another vehicle image $I_B$ with its associated foreground mask $M_B$. At step 1120, we first dilate foreground mask $M_B$ to ensure that the mask entirely includes the vehicle. At step 1130, we obtain image $I_{AB}$ by pasting the vehicle of image $I_B$ (i.e., the region defined by foreground mask $M_B$) at a random location in image $I_A$. At step 1140, we compute the intensity gradient: $G(x, y)=\nabla I_{AB}(x, y)$. At step 1150, we obtain a modified gradient field G'(x, y) by adding zeros to G(x, y) along the border pixels of the foreground mask $M_B$. At step 1160, we reconstruct image $I'_{AB}$ which minimizes $|I'_{AB}-G'|$.

Image reconstruction from gradients fields, an approximate invertibility problem, is still a very active research area. In $R^2$, a modified gradient vector field G' may not be integrable. $R^2$ denotes the vector space of bi-dimensional real vectors. We note that the present principles are not limited to using the preceding approach for calculating the modified gradient and, thus, other approaches of gradient calculation may also be employed, while maintaining the spirit of the present principles.

The least square estimate of the original intensity function, $I'_{AB}$, so that $G' \approx I_{AB}$, can be obtained by solving the Poisson differential equation $\nabla I'_{AB}=\text{div}G'$ involving a Laplace and a divergence operator. We use the standard full multi-grid method to solve the Laplace equation. We pad the images to square images of size to the nearest power of two before applying the integration, and then crop the result image back to the original size.

The resultant image $I'_{AB}$ is added to the collection of training samples and this process is repeated so that many occluded vehicle samples are generated. Note that $I'_{AB}$ provides a seamless blending of two vehicle images, even when they are captured under different lighting conditions. The superimposed image $I_{AB}$ may include pieces of the road and other artifacts due to noise in the foreground mask $M_B$. Since we modify the gradient along the border pixels of $M_B$, the resultant image $I'_{AB}$ is much cleaner and realistic.

Figure 12:
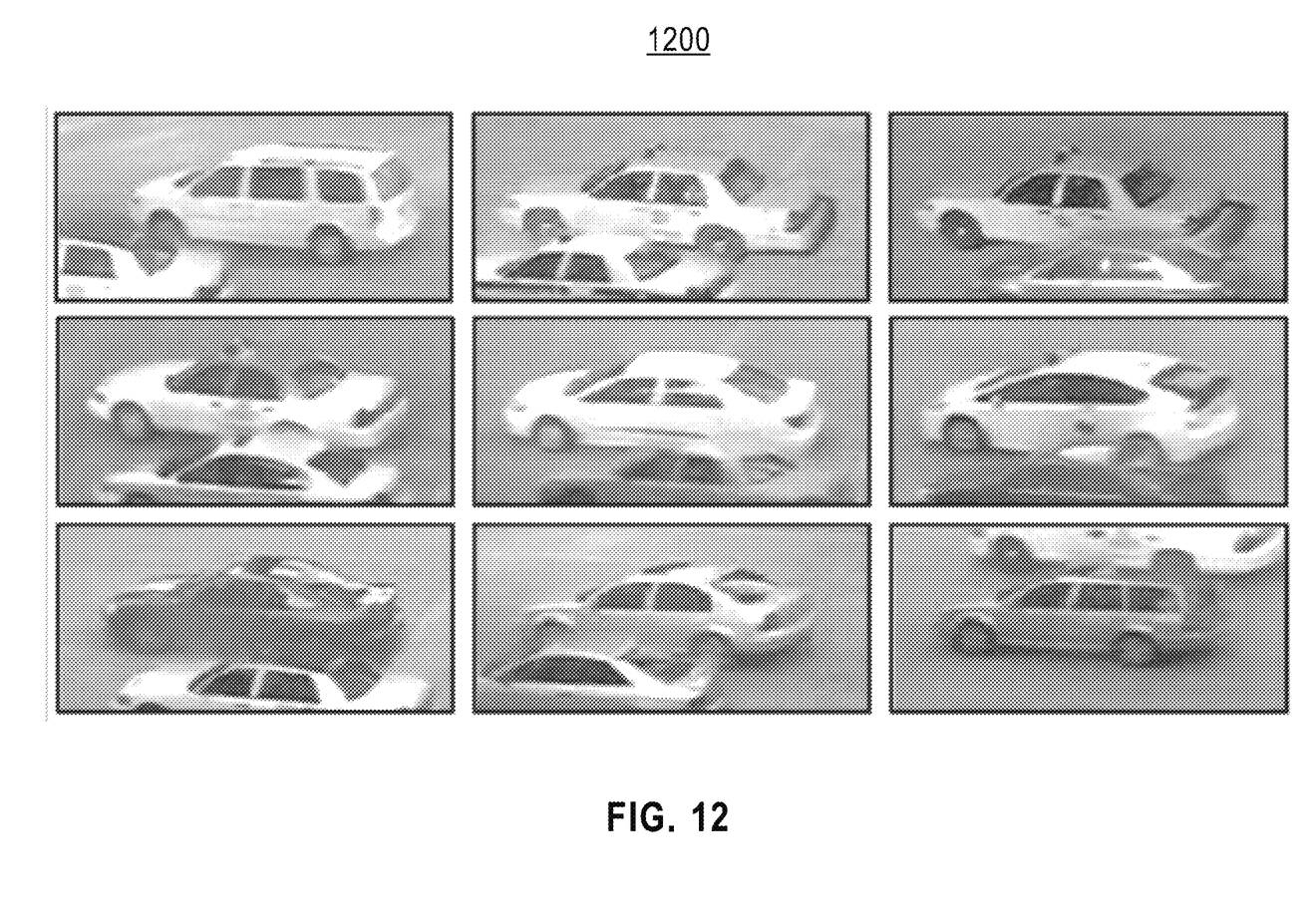
FIG. 12 shows examples 1200 of realistic occluded vehicles (training samples) generated in accordance with an embodiment of the present principles.

A similar algorithm is applied to generate images where the vehicle of image $I_A$ (which is always positioned in the center of the image) is the occluder. FIG. 12 shows examples 1200 of realistic occluded vehicles (training samples) generated in accordance with an embodiment of the present principles. The process of synthetically generating occluded images is fully automatic.

It is important to note that we always have a vehicle in the center of the training image. The position of the other vehicle is constrained by just allowing it to be placed at random locations that will create partial occlusions, not full occlusions. The training images are further cropped to have a tighter bounding box around the vehicle in the center. Since at test time our detector is based on sliding windows, if we have one vehicle occluding another vehicle, then the detector will fire twice, i.e., we will have two bounding boxes (one for each vehicle).

Large-Scale Detector Learning

For each camera-view, we learn a specific vehicle detector for each vehicle pose using training samples collected automatically as described herein before. Therefore, at test time, we usually have 1-4 detectors running per camera, which are interleaved across the video frames to improve the frame rate.

In an embodiment, regarding large-scale feature selection over multiple feature planes, we use a machine learning algorithm to improve the accuracy as well the efficiency of the final detector.

In an embodiment, we consider a huge set of potential feature configurations and develop a parallel version of the ADABOOST machine learning algorithm for making the feature selection problem tractable. In particular, we use ADABOOST, but provide a different input thereto than the prior art, namely we provide as an input the multiple feature planes. ADABOOST denotes adaptive boosting. The ADABOOST learning process includes creating a strong classifier (e.g., a vehicle detector) by linearly combining a set of weak/simple classifiers. We note that ADABOOST is adaptive in the sense that subsequent weak classifiers built are tweaked in favor of those instances misclassified by previous weak classifiers. In one embodiment, we follow a conventional implementation of ADABOOST, where each weak classifier is based on a single Haar-like feature. However, it is to be appreciated that the present principles are not limited to using ADABOOST or machine learning algorithms relating to and/or otherwise based on ADABOOST and, thus other machine learning algorithms can also be used in accordance with the present principles, while maintaining the spirit of the present principles.

In an embodiment, the machine learning algorithm involves a cascade of ADABOOST classifiers, where the weak learners are simple thresholds over Haar-like features. Each stage of the cascade is tuned to minimize false negatives at the expense of a larger number of false positives. This allows fast inference by quickly discarding background images. Bootstrapping is also employed by selecting negatives examples where the previous stages have failed.

An advantage of our learning algorithm is the introduction of multiple feature planes in the feature selection process (instead of a single grey-scale image as per the prior art). FIG. 13 shows feature selection 1300 over multiple planes, according to an embodiment of the present principles. By considering feature planes such as red, green, and blue channels, gradient magnitude, local binary patterns, thermal infrared, and many others, we allow the final detector to be much more powerful, combining Haar-like features of different modalities. In this framework, feature selection 1300 is performed over a pool including a huge set (potentially millions) of feature configurations. This poses a serious problem in terms of training time, as even with a single feature plane and a few thousand images ADABOOST training takes days on a standard desktop machine. Therefore to deal with a huge pool of local feature descriptors, we propose to parallelize training.

ADABOOST is inherently sequential, making it difficult to scale in general, but in this particular setup there is a simple solution: parallelization at the level of features. At each step during training we have to compute a large number of features for all training images and select the one that better classifies the data. This can be done in parallel, with each CPU working on a subset of the features, and the amount of synchronization necessary is minimal. For example, in an embodiment, each CPU has to report only the best feature of its subset. Additionally, at each stage, a set of negative patches is selected from the set of available negative images. The selected patches are the ones for which the current classifier fails. This is the most time consuming activity in later stages of the cascade training, taking hours even for a small training set. Parallelization can also be implemented here, with each CPU searching for negative patches in a different subset of the negative images. Again, the amount of time spent on synchronization here is comparatively very small, allowing for an almost linear speed-up with the number of CPUs employed.

So far in our implementation we have considered parallel feature selection over four color planes (gray-scale, red, green, and blue channels). As we will show in the experimental section, by adding color we not only improve the robustness of the classifier but also get a sparser solution, with a smaller number of selected features. That, in turn, reduces computation time during inference. We can add more feature planes (gradients and texture descriptors, multispectral planes, and so forth), which should improve results even further.

We note that the reason why our method is robust to environmental changes (shadows, rain, etc.) is due to the fact that our data collection method captures many images under quite different lighting conditions, and also due to our rich feature pool. The robustness to crowds and partial occlusions come from our occlusion handling method. The efficiency of our approach is due to the fact that we are learning detectors using samples of the same camera, which leads to a classifier with much less features than a generic vehicle detector. In addition, we obtain even more sparsity with large-scale feature selection.

We note that our occlusion handling technique takes into account the appearance of vehicles occluding other vehicles, but not other types of occlusions, such as a vehicle occluded by a lamp post. This could be done by automatically collecting data from object tracks in low-activity periods as vehicles may get occluded.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for object detection, comprising:
automatically collecting a set of training data images from a plurality of images;
generating occluded images, at least one having at least one synthetically originated partial occlusion;
storing in a memory the generated occluded images as part of the set of training data images;
training an object detector using the set of training data images stored in the memory; and
detecting an object using the object detector, the object detector detecting the object based on the set of training data images stored in the memory,
wherein said generating step comprises modifying an image gradient alone one or more foreground masks in a resultant image formed from at least two of the plurality of images to obtain a modified gradient, and Poisson image reconstruction is applied to the modified gradient to obtain the at least one occluded image having the at least one synthetically originated partial occlusion.

2. The method of claim 1, wherein said collecting step comprises applying a rule-based classifier to the plurality of images, the rule-based classifier using motion cues and shape cues to classify entities in the plurality of images.

3. The method of claim 2, wherein the motion cues comprise a motion direction, and the shape cues comprise an aspect ratio and a size.

4. The method of claim 2, wherein the rule-based classifier is applied to one or more regions of interest in the plurality of images, the one or more regions of interest being specified by a user.

5. The method of claim 1, wherein said training step comprises selecting a feature configuration for use in object detection.

6. The method of claim 5, wherein the feature configuration is selected over multiple feature planes.

7. The method of claim 5, wherein the feature configuration is selected over multiple feature planes in a parallel selection approach.

8. The method of claim 5, wherein said selecting step uses a machine learning algorithm over a plurality of features from which the feature configuration is selected.

9. The method of claim 8, wherein the plurality of features comprises at least two of a respective set of color channels, a gradient magnitude, local binary patterns, a thermal signature, and an infrared signature.

10. A system for object detection, comprising:
a training data collector configured to automatically collect a set of training data images from a plurality of images;
an occluded image generator configured to generate occluded images, at least one having at least one synthetically originated partial occlusion;
a memory configured to store the generated occluded images as part of the set of training data images;
an object detector; and
a detector trainer configured to train the object detector using the set of training data images stored in the memory, wherein said object detector detects an object based on the set of training data images stored in the memory, wherein said occluded image generator modifies an image gradient in a resultant image formed to include an object from one of the plurality of images in front of another object from another one of the plurality of images to obtain a modified gradient, and Poisson image reconstruction is applied to the modified gradient to obtain the at least one occluded image having the at least one synthetically originated partial occlusion.

11. The system of claim 10, wherein said training data collector applies a rule-based classifier to the plurality of images, the rule-based classifier using motion cues and shape cues to classify entities in the plurality of images.

12. The system of claim 11, wherein the motion cues comprise a motion direction, and the shape cues comprise an aspect ratio and a size.

13. The system of claim 10, wherein said detector trainer selects a feature configuration for use in object detection.

14. The system of claim 13, wherein the feature configuration is selected over multiple feature planes.

15. The system of claim 13, wherein the feature configuration is selected over multiple feature planes in a parallel selection approach.

16. The system of claim 13, wherein said detector trainer uses a machine learning algorithm over a plurality of features from which the feature configuration is selected.

17. The system of claim 16, wherein the plurality of features comprises at least two of a respective set of color channels, a gradient magnitude, local binary patterns, a thermal signature, and an infrared signature.

18. A non-transitory computer readable storage medium comprising a computer readable program, wherein the computer readable program when executed on a computer causes the computer to perform the following:
   automatically collect a set of training data images from a plurality of images;
   synthetically generate occluded images using Poisson image reconstruction applied to image gradients of at least some of the training data images in the set, at least one of the synthetically generated occluded images having at least one synthetically originated partial occlusion;
   store the synthetically generated occluded images as part of the set of training data images;
   train an object detector using the set of training data images that include the synthetically generated occluded images; and
   detect an object using the object detector, the object detector detecting the object based on the set of training data images that include the synthetically generated occluded images,
   wherein said synthetically generating step comprises modifying an image gradient alone one or more foreground masks in a resultant image formed from at least two of the plurality of images to obtain a modified gradient, and Poisson image reconstruction is applied to the modified gradient to obtain the at least one of the synthetically generated occluded images having the at least one synthetically originated partial occlusion.

19. The non-transitory computer readable storage medium of claim 18, wherein said collecting step comprises applying a rule-based classifier to the plurality of images, the rule-based classifier using motion cues and shape cues to classify entities in the plurality of images.

20. A method for object detection, comprising:
   automatically collecting a set of training data images from a plurality of images;
   synthetically generating occluded images using Poisson image reconstruction applied to modified image gradients of a resultant image formed from at least some of the training data images in the set, at least one of the synthetically generated occluded images having at least one synthetically originated partial occlusion, the modified image gradients obtained from modifying gradients along one or more foreground masks in the resultant image;
   storing in a memory the synthetically generated occluded images as part of the set of training data images;
   training an object detector by applying a machine learning algorithm over the set of training data images stored in the memory to select a feature configuration for use in object detection; and
   detecting an object using the object detector, the object detector detecting the object based on the set of training data images stored in the memory and the feature configuration selected using the machine learning algorithm.

21. The method of claim 1, wherein the image gradient is modified along the one or more foreground masks of an object and another object placed in front of the object in the resultant image, the object and the other object from respective different ones of the at least two of the plurality of images.

22. The system of claim 10, wherein the image gradient is modified along one or more foreground masks in the resultant image.

23. The system of claim 10, wherein the object is randomly placed in front of the other object in the resultant image.

24. The computer readable storage medium of claim 18, wherein the image gradient is modified along the one or more foreground masks of an object and another object placed in front of the object in the resultant image, the object and the other object from respective different ones of the at least two of the plurality of images.

25. The method of claim 20, wherein at least one of the image gradients is modified along the one or more foreground masks of an object and another object placed in front of the object in the resultant image, the object and the other object from respective different ones of the at least two of the plurality of images.

* * * * *